July 9, 1940.　　　　　R. T. CLOUD　　　　　2,206,863
ELECTRICAL LOGGING OF EARTH FORMATIONS
Filed April 5, 1939　　　　3 Sheets-Sheet 1

INVENTOR
Raymond T. Cloud
BY Clarence H. Seeley
ATTORNEY

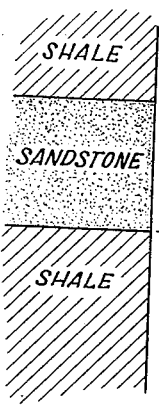 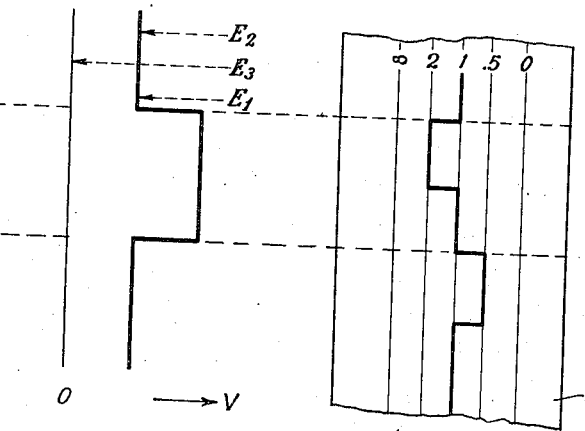
Fig.4A    Fig.4B    Fig.4C
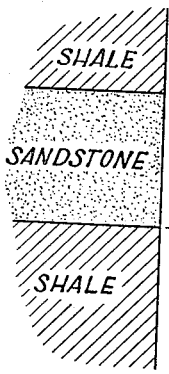 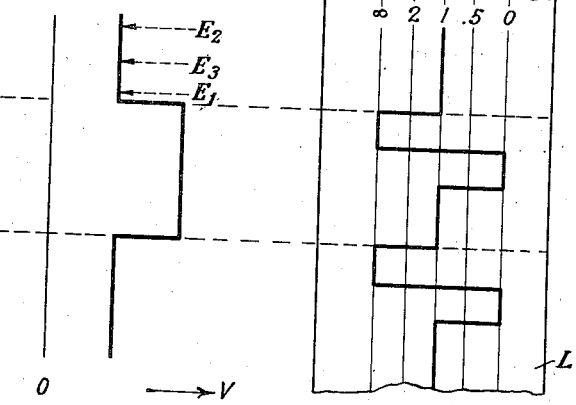
Fig.5A    Fig.5B    Fig.5C July 9, 1940.  R. T. CLOUD  2,206,863
ELECTRICAL LOGGING OF EARTH FORMATIONS
Filed April 5, 1939  3 Sheets-Sheet 3

INVENTOR
Raymond T. Cloud
BY Clarence H. Seeley
ATTORNEY

Patented July 9, 1940

2,206,863

UNITED STATES PATENT OFFICE 2,206,863

ELECTRICAL LOGGING OF EARTH FORMATIONS

Raymond T. Cloud, Tulsa, Okla., assignor to Stanolind Oil and Gas Company, Tulsa, Okla., a corporation of Delaware Application April 5, 1939, Serial No. 266,213

15 Claims. (Cl. 175—182)

This invention relates to the electrical logging of earth formations and more particularly to methods and apparatus for making a record of the porous or liquid-bearing strata traversed by a well or bore hole.

A number of methods of logging wells electrically are known to the art and among them are methods which distinguish the various strata by measuring their specific resistivities or some function thereof. The more practical of these resistivity methods differentiate certain strata sufficiently well for correlation purposes, but none of them gives enough information to locate points of entry of water or oil. For example, a stratum of shale has about the same specific resistivity as a water-bearing sandstone, so that the location of the latter cannot be determined with accuracy by a resistivity method.

The necessity for locating water-bearing strata within relatively close limits is well recognized because without such information it is not possible to seal off water from entering the well, for example by cementing, while permitting the entry of oil. Strata bearing fluids are distinguished from strata that do not contain an appreciable amount thereof by the fact that the natural potentials existing between points located in such strata are greater than those in the closely packed strata carrying little or no fluid. The source of these natural potentials is not entirely understood, the principal theories being that they are due to the motion of the liquids through the capillary interstices of the porous structure or to electrochemical action in the earth, but the fact remains that natural potentials do exist under the conditions stated.

In the past these natural potentials have been measured directly by lowering an electrode down the well and measuring the potential difference between this electrode and another at the surface or lowering two vertically-spaced electrodes and measuring the potential gradient across them. These procedures often fail to define the boundaries of porous strata with the exactness necessary to insure that the proper steps can be taken to exclude water and admit oil.

It is an object of my invention to provide a method and apparatus by which an extremely clear indication is given of the boundaries of porous strata traversed by a bore hole. Another object is to provide a novel system for utilizing relative rather than absolute values of natural potential whereby easily interpreted logs of porous strata in wells can be obtained. Further objects and advantages of my invention will be apparent from the following description thereof read in conjunction with the drawings, in which:

Figures 4A and 5A show typical geologic sections, each having a stratum of pervious sandstone between layers of relatively impervious shale.

Figures 4B and 5B are graphs of the natural potentials which would be found in a well traversing the formations of Figures 4A and 4B, respectively.

Figures 4C and 5C illustrate idealized records of the type obtainable utilizing the apparatus of Figures 1, and 2 or 3 in wells traversing the geologic sections of Figures 4A and 5A, respectively.

In one of its broadest aspects my invention comprises measuring the ratio of the natural potential differences between each of two points within the well in which it is desired to locate the porous strata and a reference point in electrical contact with the earth. This is best accomplished by changing the level of at least two spaced electrodes, which will be hereinafter referred to as exploring electrodes, within the well being logged, and measuring the ratio of the potential differences between each of the exploring electrodes and a reference electrode. Preferably this operation is carried out continuously and the measurements recorded, but if desired, readings can be taken at any selected intervals of depth or time. In practicing my invention the well to be logged must, of course, be uncased so that the natural potentials in the various formations will be impressed on the electrodes in the well and the latter is preferably filled with a fluid such as water or drilling mud at the levels to be logged so that the electrodes will be in electrical contact with those formations, although under some conditions electrodes making mechanical contact with the well walls can be used.

The electrodes preferably have non-polarizing characteristics and the exploring electrodes must be substantially identical in order to avoid the production of undesired electromotive forces. The reference electrode can be located in any suitable position in electrical contact with the earth, for example, at the surface or in the well as a part of the electrode array, and in the latter case it is preferably, but not necessarily, placed between the exploring electrodes so that the variations in the ratio of the potential differences obtained will be more pronounced.

Figure 1:
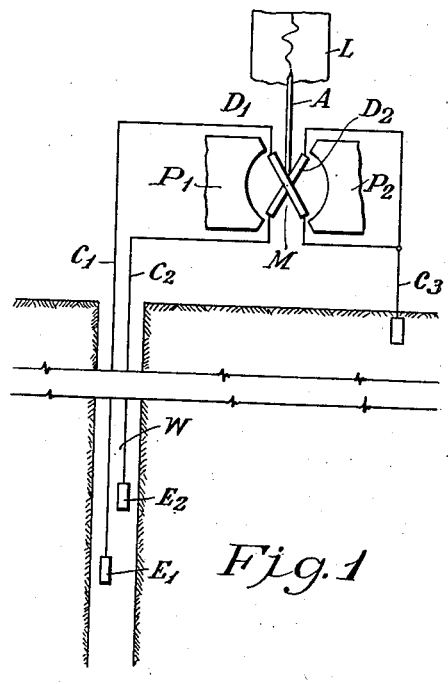
Figures 1, 2 and 3 show schematically, forms of apparatus for obtaining porosity logs according to my invention.

My invention also includes a number of other features and these will be brought out as the description proceeds. Referring now to the drawings, Figure 1 shows schematically the essential apparatus for practicing my invention when the reference electrode is at the surface of the earth. Exploring electrodes $E_1$ and $E_2$, which are preferably vertically spaced as shown, are lowered into well W by conventional means (not shown), and are connected by means of electrical conductors $C_1$ and $C_2$ respectively to one terminal of coils $D_1$ and $D_2$ of ratio type galvanometer M, these coils being arranged to rotate at a fixed angle to each other between magnetic pole pieces $P_1$ and $P_2$. Electrodes $E_1$ and $E_2$ will generally be arranged in an array with a relatively small fixed distance between them, for example about 1 to 5 feet. The electrical circuits are completed by connecting the second terminal of both coils $D_1$ and $D_2$ by means of conductor $C_3$ to reference electrode $E_3$, which is grounded at the surface of the earth. Ratio meter M is also preferably provided with recording means, shown by way of example as pen arm A and recording strip L, which generally will be moved in the conventional manner at a rate proportional to that at which the level of the electrode array in the well is changed. Instead of the pen apparatus shown, any of the well-known photographic methods of recording may be used.

In locating porous strata with the apparatus of Figure 1, the level of electrodes $E_1$ and $E_2$ is changed, preferably continuously, and the natural potential differences between electrodes $E_1$ and $E_3$ and electrodes $E_2$ and $E_3$ at every instant are impressed on coils $D_1$ and $D_2$. These coils are so arranged that the currents flowing through them tend to move arm A in opposite directions and attain a position which is a known function of the ratio between these natural potential differences. As the electrodes in the well are raised or lowered, arm A changes position as the ratio between these potential differences changes, thus giving a log of such changes on recording strip L. The record obtained in this way is particularly adapted to locating the interfaces between porous and non-porous strata since it is not influenced by the absolute value of the natural potentials present, but only by the ratio between them.

Figure 2:
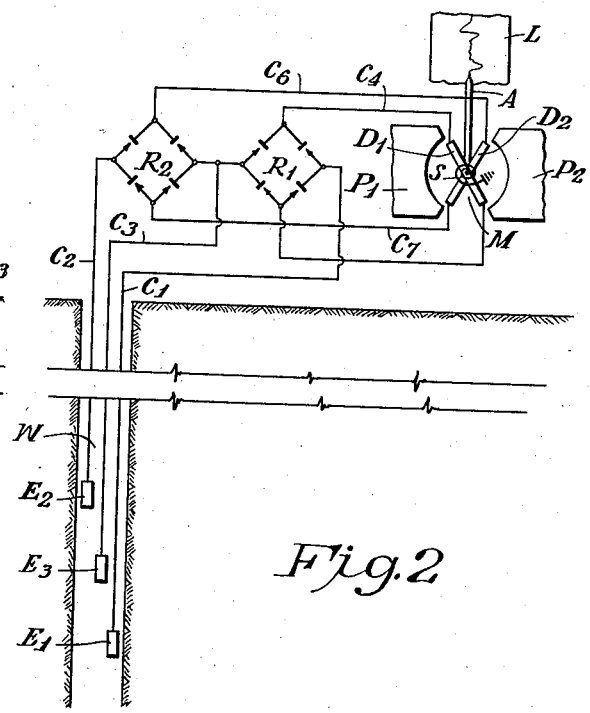

Another embodiment of my invention using a three electrode array in the well is shown in Figure 2. The two exploring electrodes $E_1$ and $E_2$ in well W are connected by conductors $C_1$ and $C_2$ to one side of rectifiers $R_1$ and $R_2$, respectively. The other sides of these two rectifiers are connected by conductor $C_3$ to reference electrode $E_3$, which is preferably between exploring electrodes $E_1$ and $E_2$ as shown. The rectified potential difference between electrodes $E_1$ and $E_3$ is impressed across coil $D_1$ by means of conductors $C_4$ and $C_5$ while that between electrodes $E_2$ and $E_3$ after being rectified is conducted to coil $D_2$ by conductors $C_6$ and $C_7$. As shown in Figure 2, rectifiers $R_1$ and $R_2$ are of the oxide type but other types of full-wave rectifiers can be used equally well. The two coils $D_1$ and $D_2$ form part of a ratio meter M such as that shown in Figure 1. It is apparent that the deflection of pen arm A and consequently the record on recording strip L will be a function of the ratio of the rectified natural potential differences between electrodes $E_1$ and $E_3$ and $E_2$ and $E_3$, respectively.

It will be shown in connection with Figure 5c that this type of electrode configuration will give a marked distinctive pattern when the electrodes pass the interface between a porous and a non-porous stratum in the well. While I prefer to use rectifiers $R_1$ and $R_2$ in connection with this electrode configuration, they are not absolutely essential to produce a usable porosity log of the well. In fact the omission of rectifiers $R_1$ and $R_2$ produces a log somewhat similar to that obtained from the equipment of Figure 2. However, important and unobvious advantages result from the use of some type of rectification of the potential differences involved.

Figure 3:
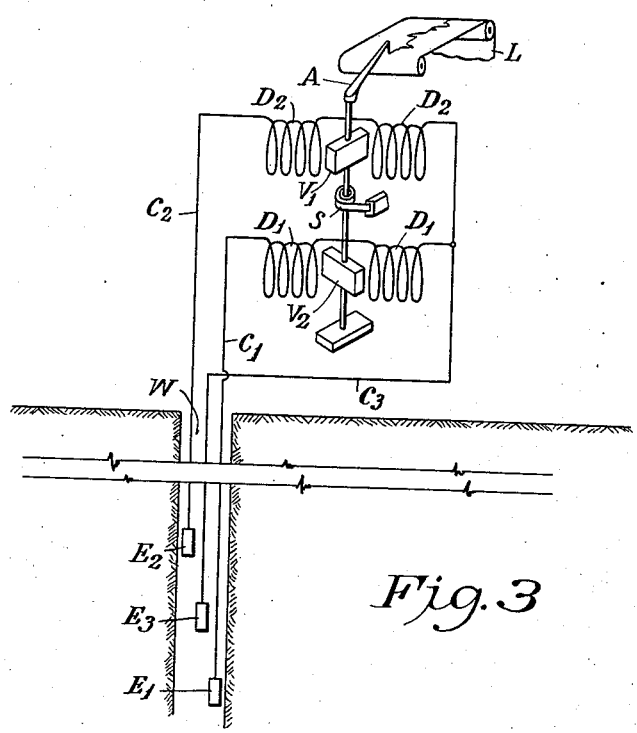

In Figure 3 I have shown another type of apparatus involving the same principle of recording as in Figure 2, but utilizing a double iron vane type ratio meter which produces deflections indicative of the ratio between the absolute values of the potential differences impressed across its coils. Electrodes $E_1$ and $E_3$ are connected to coil $D_1$ by means of conductors $C_1$ and $C_3$ respectively and electrodes $E_2$ and $E_3$ are connected to coil $D_2$ by means of conductors $C_2$ and $C_3$.

Iron vanes $V_1$ and $V_2$ are attached to the shaft of the recording unit at a fixed angle with respect to each other, and when no current is passed through coils $D_1$ and $D_2$, vanes $V_1$ and $V_2$ are held at substantially equal and opposite angles with respect to the axes of coils $D_1$ and $D_2$, respectively, by means of hair spring S. As soon as current flows in either coil there is a tendency for the vanes to rotate and line up their long axes in the direction of the magnetic field set up by the respective coils.

The tendency of the shaft to rotate due to the torque impressed by vane $V_1$ is opposed by the torque due to vane $V_2$. Since $V_1$ and $V_2$ are of soft iron the forces acting on them will be the same regardless of the direction of flow of current in the coils. Thus the action of this type of ratio meter is the same as that of Figure 2 when the separate rectifiers are employed.

Examples of some types of records obtained according to my invention are given in idealized form in Figures 4C and 5C. Figures 4A and 5A show a typical geologic section with a stratum of pervious sandstone between layers of relatively impervious shale. The natural potential which would be found in a well traversing these formations is shown by the graph of Figures 4B and 5B. It is of course recognized that the natural potentials are not as constant for a given stratum and that the changes at the boundaries of the strata are not as abrupt as shown, but these illustrations will serve to assist in further clarifying my invention.

Figure 4C shows the type of porosity log obtained using the equipment of Figure 1, and Figure 5C shows the type of log resulting from the use of apparatus similar to that shown in Figures 2 or 3. Also shown in Figure 4B is the spacing between electrodes $E_1$ and $E_2$, which is maintained as they are raised or lowered within the well being logged. At the point in the formations at which this electrode configuration is shown, the potential difference between $E_1$ and $E_3$ (applied to the coil $D_1$) is equal to that between electrodes $E_2$ and $E_3$ (applied to the coil $D_2$). Hence the ratio between the currents in the two coils due to the differences of potential above mentioned will be 1, and the recording arm A will accordingly be positioned at the line representing this value shown in the log represented by Figure 4C. The recording strip L is considered to move upward past the recording pen point at the same rate at which the electrodes are lowered into the well, and the light lines represent the values of the ratio between currents in coils $D_1$ and $D_2$.

As soon as electrode $E_1$ is positioned opposite the pervious sandstone stratum it will be obvious from the diagram of Figure 4B that the potential difference between $E_1$ and $E_3$ will be greater, and as shown, twice that between $E_2$ and $E_3$ and that this situation will continue until electrode $E_2$ is positioned opposite the sandstone stratum. Thus during an interval corresponding to the spacing between electrodes $E_1$ and $E_2$ the arm of the ratio meter will swing to a value representing the ratio 2. As soon as both electrodes are opposite the pervious stratum the relative potential differences with respect to the surface electrode $E_3$ become equal, and the ratio meter arm swings back to 1. Likewise as soon as electrode $E_1$ passes from a position opposite the sandstone stratum to one opposite the lower shale stratum, the potential difference between $E_1$ and $E_3$ will be one-half of that between electrodes $E_2$ and $E_3$, and during the interval that $E_1$ is opposite the shale but $E_2$ is still opposite sandstone the ratio meter arm will swing to the value of 0.5. When both electrodes are opposite the same medium (say the lower shale stratum) the ratio of the above mentioned potential differences will become 1 again.

By reference to Figures 4B and 4C, the record pattern obtained when entering and leaving a porous stratum will be seen to be composed of two distinctive swings of equal duration. By this means it is obvious that a definite and unmistakable indication of the presence of a porous stratum in the well can be made and that it will be immediately apparent from the direction of the deflection whether the electrodes are entering or leaving the porous stratum. The thickness of the stratum will be given by the distance between corresponding points of initial throw on the well log. As was above stated this log is idealized but the principles applied above still hold regardless of the precise voltage variations present in the well due to the change in porosity.

I have found that the type of apparatus shown in Figures 2 and 3 will give a different type of log which will contain sharper indications of the points at which porous strata are entered and left. This will be explained in connection with Figures 5B and 5C. It will be noted that the variation in natural potential as represented by the graph in Figure 5B is identical with that shown in Figure 4B. However, as shown diagrammatically by the dotted arrows the three electrodes are now positioned in the hole so that at the point shown there is no potential difference between electrodes $E_1$ and $E_3$, and electrodes $E_2$ and $E_3$. Obviously the ratio between these two quantities is indeterminate. However, hair spring S in Figures 2 and 3, is arranged to hold the recording arm A at the value corresponding to ratio of unity when there is no force exerted on the recording coils (Figure 2) or vanes (Figure 3). Hence until electrode $E_1$ is positioned opposite the sandstone stratum the value of the record shown on the log in Figure 5C will be unity.

For the interval during which only electrode $E_1$ is positioned opposite the sand stone stratum as the electric array is lowered, there will be a definite potential difference between electrodes $E_1$ and $E_3$ and no potential difference between electrodes $E_2$ and $E_3$. The value of the ratio of the rectified currents corresponding to these potential differences will be infinite and the record will show a rapid deflection to the light line marked infinite. As soon as electrode $E_3$ is also opposite the sandstone stratum the potential difference between $E_1$ and $E_3$ drops to zero while that between electrodes $E_2$ and $E_3$ will become finite, and the ratio of the rectified currents will therefore become zero. Thus there is rapid deflection across the log from the point infinity to zero, and the record will show a value of zero until electrode $E_2$ is opposite the sandstone stratum. At this point the potential differences again become zero and hair spring S returns the recording arm A to the value 1.

When electrode $E_1$ leaves the sandstone and enters the lower shale stratum there is again a definite potential difference between electrodes $E_1$ and $E_3$ but none between electrodes $E_2$ and $E_3$ and the ratio is again infinite. Without carrying the analysis further it is obvious that the same recording cycle will be repeated, so that the portion of the total log shown in Figure 5C, will contain two identical patterns separated by the distance corresponding to the thickness of the porous sandstone stratum.

This type of log has the advantage over the log shown in Figure 4C, in that the deflections are much greater and hence are more easily distinguishable. On the other hand the log shown in Figure 4C has the advantage over that shown in Figure 5C, in that one can distinguish between the entry into and the exit from a porous stratum. I have found that both of these types of logs produce a sharper indication of the presence of porous strata than do the types of logs already known to the art.

Figure 6:
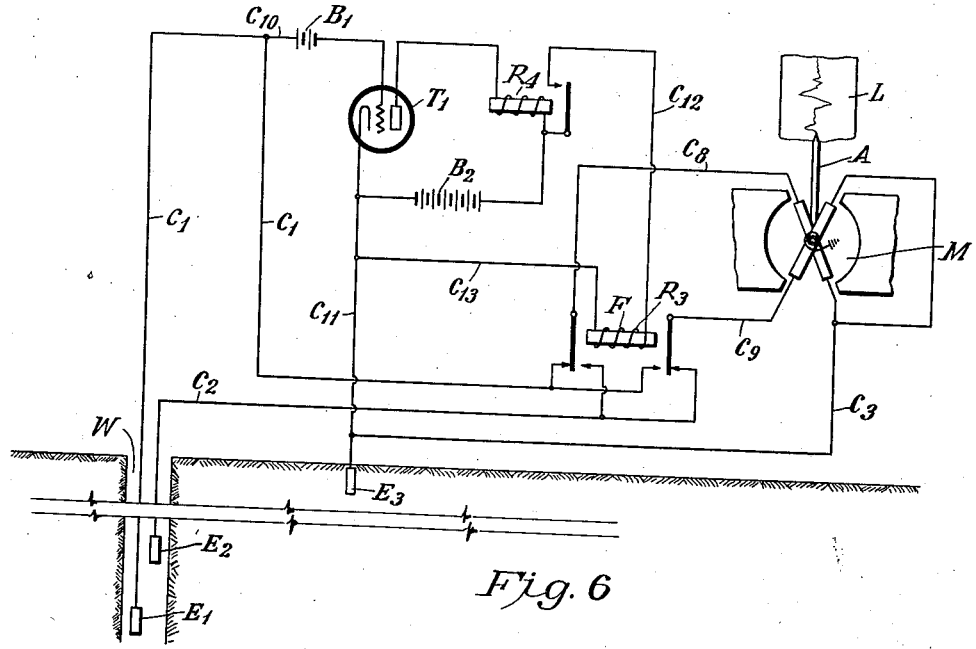
Figure 6 shows an apparatus similar to that of Figure 1, but including an automatic polarity changing circuit.

Usually the natural potentials down a well are of the same polarity with relation to the fixed point at the surface. However, in some cases there is a reversal of potential at one or more points down the well, and a false record will be obtained with the indicated locations of the porous and non-porous structures reversed, unless these points of reversal are known. Of course, an observer can note the points of reversal and change the polarity of the recording apparatus accordingly, but this is generally not satisfactory, and I have devised means for accomplishing the desired purpose automatically. For purposes of illustration my automatic reversing device is shown in Figure 6 as applied to apparatus of the type described in connection with Figure 1, but it is apparent that my reversing device is applicable to other methods of locating porous formations utilizing natural potentials. The two exploring electrodes $E_1$ and $E_2$ within well W are connected to the coils of ratio type galvanometer M and reference electrode $E_3$ is connected to the opposite end of each of these coils by means of electrical conductor $C_3$. However, a pole-reversing relay $R_3$ having an energizing coil F is interposed between electrodes $E_1$ and $E_2$ and ratio meter M, the natural potential of electrode $E_1$ being applied to one coil of meter M by means of conductors $C_1$ and $C_8$ and that of electrode $E_2$ to the other coil thereof by means of conductors $C_2$ and $C_9$ when coil F has no current passing through it. When coil F is energized, relay $R_3$ operates to reverse the connections between meter M and electrodes $E_1$ and $E_2$.

The potential from one of the well electrodes, in this case electrode $E_1$, is applied to the grid of a vacuum tube $T_1$ by means of line $C_{10}$ which contains also a bias battery $B_1$ and the cathode of tube $T_1$ is grounded by means of conductor $C_{11}$ leading to electrode $E_3$. The electromotive force of battery $B_1$ is chosen so that tube $T_1$ is biased to the cut-off point when the potential difference between electrodes $E_1$ and $E_3$ is zero so that as long as electrode $E_1$ has a zero or negative potential with respect to reference electrode $E_3$, no current will flow in the plate circuit of tube $T_1$ and relay $R_3$ will remain in the position shown. When the potential of electrode $E_1$ is positive, current from battery $B_2$ will flow in the plate circuit which will close sensitive relay $R_4$ which will in turn allow current from battery $B_2$ to flow through lines $C_{12}$ and $C_{13}$ and energize coil $F$, thus reversing the polarity of meter $M$. It is readily apparent from the above that uniform readings down the well indicative of the location of porous strata will be obtained and that the same type of circuit can be readily applied to other forms of apparatus embodying my invention.

Usually the natural potentials encountered down a well are very small, sometimes as low as a few millivolts, and there is often insufficient energy to operate the relatively rugged types of recording meters suitable for field use. It is, therefore, desirable and sometimes necessary to amplify these potentials before they are utilized in accordance with my invention. There is also an additional advantage in impressing the natural potentials of the well electrodes upon the grids of amplfying tubes inasmuch as these grids can be biased so as to draw no current from the source. Even small currents would appreciably affect the readings in some cases, for example when attenuated electrolytes in the well fluid interpose a high resistance in series with the potential measuring circuit.

Figure 7:
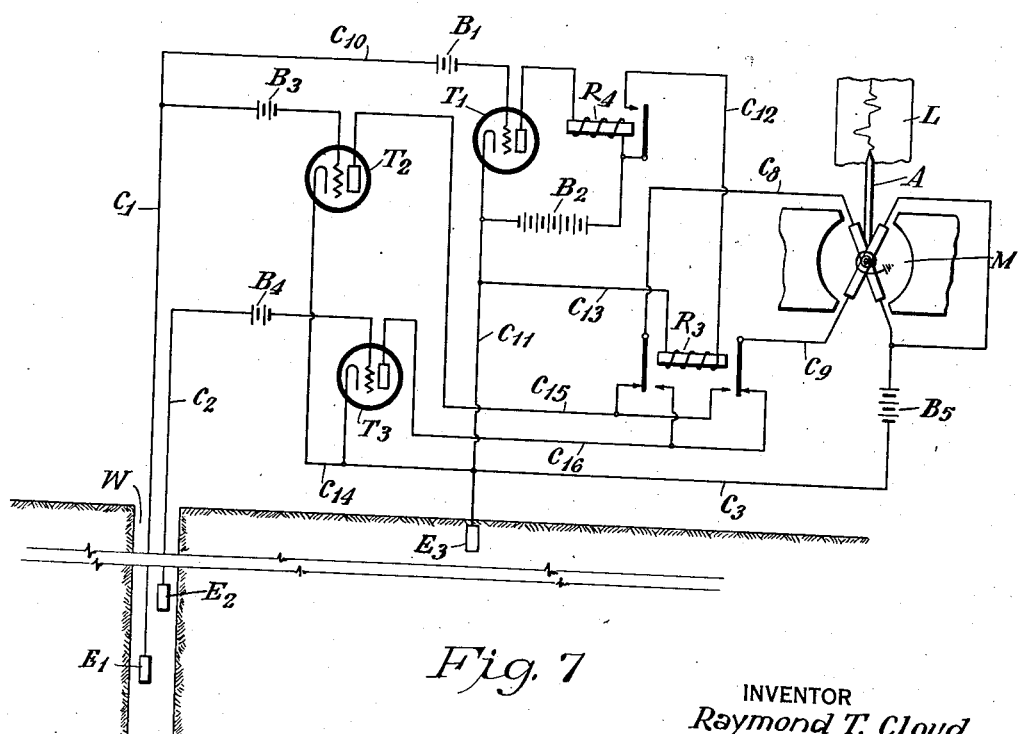
Figure 7 shows one way in which amplification and automatic polarity changing can be applied simultaneously to the apparatus of Figure 1.

Figure 7 shows a form of apparatus according to my invention based on that illustrated in Figure 1, but including amplification and polarity-reversing means. Well $W$ contains an array of vertically-spaced electrodes $E_1$ and $E_2$, which are connected by means of conductors $C_1$ and $C_2$ through biasing batteries $B_3$ and $B_4$ to the grids of amplifying vacuum tubes $T_2$ and $T_3$ respectively, while reference electrode $E_3$ is connected to the cathodes of both tubes by conductor $C_{14}$ and also to ratio meter $M$ through battery $B_5$ by means of conductor $C_3$. The plate circuits of tubes $T_2$ and $T_3$, which carry the amplified currents proportional in value to the natural potentials impressed on electrodes $E_1$ and $E_2$, are completed by means of conductors $C_{15}$ and $C_{16}$ respectively, polarity reversing relay $R_3$ and lines $C_8$ and $C_9$ to ratio meter $M$.

It will be unnecessary to describe the polarity-reversing circuit in detail since it operates exactly as in Figure 6, the grid of polarity tube $T_1$ being connected to conductor $C_1$ through biasing battery $B_1$, and the filament of tube $T_1$ being grounded by means of conductor $C_{11}$ to electrode $C_3$. Obviously no plate current will flow when the potential of electrode $E_1$ is zero or negative with respect to electrode $E_3$, but if it becomes positive, relay $R_4$ will close due to the flow of plate current through tube $T_1$, thus allowing current from battery $B_2$ to operate polarity-reversing relay $R_3$.

Many apparatus details have been omitted for the sake of simplicity but these can be readily supplied by those skilled in the art. For example, the complete filament circuits of the various tubes are not shown, nor are various switches, resistances, etc. Obviously the vacuum tubes used should be such that the plate current will be substantially linear with respect to grid voltage over the range of natural potentials encountered in wells, which is of the order of a few hundred millivolts.

While I have described my invention in connection with certain specific embodiments thereof, I do not desire to be limited thereto, but only by the following claims in which I have defined my invention.

I claim:

1. The method of logging earth formations traversed by a well which comprises measuring the ratio of the natural potential differences between each of two points within said well and a reference point in electrical contact with the earth.

2. The method of claim 1 wherein said reference point is at the surface of the earth.

3. The method of claim 1 wherein said reference point is within said well and between said two points therein.

4. The method of logging earth formations traversed by a well which comprises measuring at various levels within said well a function of the ratio of the natural potential differences between each of two vertically spaced points within said well and a reference point in electrical contact with the earth.

5. The method of logging earth formations traversed by a well which comprises changing the level of two spaced exploring electrodes within said well, and measuring the ratio of the natural potential differences between each of said exploring electrodes and a reference electrode.

6. The method of locating the boundaries of porous formations traversed by a fluid-containing well which comprises changing the level of two vertically spaced exploring electrodes within said well and recording a function of the ratio of the natural potential difference between each of said exploring electrodes and a reference electrode in electrical contact with the earth.

7. The method of locating the boundaries of porous formations traversed by a fluid-containing well which comprises changing the level of two vertically spaced exploring electrodes within said well, producing independent electrical currents having values responsive to the natural potential differences between each of said exploring electrodes and a reference electrode in electrical contact with the earth, and measuring a function of the ratio of said electrical currents.

8. The method of locating the boundaries of porous formations traversed by a fluid-containing well which comprises changing the level of an array of three vertically spaced electrodes within said well, producing independent electrical currents having values responsive to the natural potential differences between each of two electrodes in said array and the third electrode in said array, separately rectifying said electrical currents, and measuring a function of the ratio of said rectified electrical currents.

9. The method of claim 8 wherein said third electrode is positioned between the other electrodes in said array.

10. Apparatus for logging earth formations traversed by a well comprising two exploring electrodes adapted to be lowered into said well, a reference electrode adapted to be placed in electrical contact with the earth, and means for measuring a function of the ratio of the natural potential differences between each of said exploring electrodes and said reference electrode.

11. Apparatus for locating the boundaries of porous formations traversed by a fluid-containing well comprising an array of at least two vertically spaced electrodes adapted to be lowered into said well, a reference electrode adapted to be placed in electrical contact with the earth, and means for measuring and recording a function of the ratio of the natural potential differences between each of said two vertically spaced electrodes and said reference electrode.

12. Apparatus for locating the boundaries of porous formations traversed by a fluid-containing well comprising an array of three vertically spaced electrodes adapted to be lowered into said well, and means for measuring and recording a function of the ratio of the natural potential differences between the intermediate electrode in said array and each of the other electrodes in said array.

13. Apparatus for locating the boundaries of porous formation traversed by a fluid-containing well comprising an array of three vertically spaced electrodes adapted to be lowered into said well, means for producing independent electrical currents having values responsive to the natural potential differences between each of two electrodes in said array and the third electrode in said array, means for separately rectifying said electrical currents and means for measuring a function of the ratio between said rectified electrical currents.

14. Apparatus for logging earth formations traversed by a well comprising two exploring electrodes adapted to be lowered into said well, a reference electrode adapted to be placed in electrical contact with the earth, means for measuring a function of the ratio of the natural potential differences between each of said exploring electrodes and said reference electrode, and means for reversing the polarity of said measuring means with respect to said exploring electrodes when the polarity of the potential difference between one of said exploring electrodes and a reference point having a constant potential is reversed.

15. Apparatus for logging earth formations traversed by a well comprising two exploring electrodes adapted to be lowered into said well, a reference electrode adapted to be placed in electrical contact with the earth, means for producing separate amplified electrical currents varying in a manner substantially proportional to the natural potential differences between each of said exploring electrodes and said reference electrode, and means for measuring and recording a function of the ratio of said electrical currents.

RAYMOND T. CLOUD.